(12) United States Patent  
Stanley

(10) Patent No.: US 8,915,116 B2  
(45) Date of Patent: Dec. 23, 2014

(54) SYSTEMS AND METHOD FOR GYROSCOPE CALIBRATION

(71) Applicant: Michael E. Stanley, Mesa, AZ (US)

(72) Inventor: Michael E. Stanley, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 149 days.

(21) Appl. No.: 13/748,381

(22) Filed: Jan. 23, 2013

(65) Prior Publication Data  
US 2014/0202229 A1 Jul. 24, 2014

(51) Int. Cl.  
G01C 25/00 (2006.01)

(52) U.S. Cl.  
CPC .................................. G01C 25/005 (2013.01)  
USPC .................................... 73/1.77; 73/504.02

(58) Field of Classification Search  
CPC ............... G01C 25/00; G01C 25/005; G05B 2219/37008; G05B 2219/39058; G05B 21/00  
USPC ................. 73/1.37, 1.38, 1.77, 1.79, 503.3, 73/504.12, 507  
See application file for complete search history.

(56) References Cited

U.S. PATENT DOCUMENTS

| | | | |
|---|---|---|---|
| 4,347,730 A | 9/1982 | Fisher et al. | |
| 5,321,631 A * | 6/1994 | Germanetti | 701/501 |
| 5,446,465 A * | 8/1995 | Diefes et al. | 342/357.34 |
| 5,506,588 A * | 4/1996 | Diefes et al. | 342/357.27 |
| 5,548,293 A * | 8/1996 | Cohen | 342/357.38 |
| 6,223,105 B1 * | 4/2001 | Teague | 701/13 |
| 6,496,779 B1 * | 12/2002 | Hwang | 701/500 |
| 6,594,582 B1 * | 7/2003 | Quinn | 701/470 |
| 6,636,826 B1 * | 10/2003 | Abe et al. | 702/151 |
| 6,997,882 B1 * | 2/2006 | Parker et al. | 600/534 |
| 7,587,277 B1 | 9/2009 | Wells | |
| 7,970,500 B2 * | 6/2011 | Parra Carque | 701/7 |
| 8,344,303 B2 * | 1/2013 | Elgersma et al. | 244/3.21 |
| 2004/0020064 A1 | 2/2004 | Levi et al. | |
| 2005/0038560 A1 * | 2/2005 | Nagasaka | 700/245 |
| 2005/0240347 A1 | 10/2005 | Yang | |
| 2007/0032748 A1 * | 2/2007 | McNeil et al. | 600/595 |
| 2007/0213889 A1 * | 9/2007 | Parra Carque | 701/7 |
| 2010/0018285 A1 * | 1/2010 | Murphy et al. | 73/1.79 |

(Continued)

OTHER PUBLICATIONS

Baharev; "Gyroscope calibration"; "Szenzorhálózat alapú adatgyüjtés és információfeldolgozás" workshop, Szeged, Hungary; Sep. 2-3, 2010; 23 Pages.

(Continued)

Primary Examiner — Peter Macchiarolo  
Assistant Examiner — Samir M Shah  
(74) Attorney, Agent, or Firm — Jonathan N. Geld

(57) ABSTRACT

A mechanism by which a MEMS gyroscope sensor can be calibrated using data gathered from other sensors in a system incorporating the MEMS gyroscope sensor is provided. Data gathered from an accelerometer and a magnetometer in fixed orientation relative to the gyroscope is used to calculate changes in orientation of a system. A constant acceleration vector measured by the accelerometer and a constant magnetic vector measured by the magnetometer are used as reference vectors in a solution to Wahba's problem to calculate a rotation matrix providing the system's orientation with respect to those two constant vectors. By comparing changes in orientation from one time to a next time, measured rates of angular change can be calculated. The measured rates of angular change can be used along with observed gyroscope rates of angular change as input to a linear regression algorithm, which can be used to compute gyroscope trim parameters.

15 Claims, 6 Drawing Sheets

(56) References Cited

U.S. PATENT DOCUMENTS

| | | | |
|---|---|---|---|
| 2011/0007167 A1* | 1/2011 | Katake et al. | 348/172 |
| 2011/0066395 A1 | 3/2011 | Judd | |
| 2012/0075109 A1* | 3/2012 | Wang et al. | 340/686.1 |
| 2012/0104150 A1* | 5/2012 | Elgersma et al. | 244/3.21 |
| 2013/0081442 A1* | 4/2013 | Basir et al. | 73/1.38 |
| 2013/0185018 A1* | 7/2013 | Sheng, Hua | 702/153 |
| 2013/0245984 A1* | 9/2013 | Sheng, Hua | 702/94 |

OTHER PUBLICATIONS

Batista et al.; "Vectr-based Attitude Filter for Space Navigation"; Journal of Intelligent & Robotic Systems; Jan. 2011; pp. 1-21.

Fong et al.; "Methods for in-field user calibration of an inertial measurement unit without external equipment"; Measurement Science & Technology; 2008; pp. 1-11; vol. 19; IOP Publishing.

Gebre-Egziabher et al.; "A Gyro-Free Quaternion-Based Attitude Determination System Suitable for Implementation Using Low Cost Sensors"; Position Location and Navigation Symposium; 2000; pp. 185-192; IEEE.

Singla et al.; "Attitude and Interlock Angle Estimation using Split-Field-of-View Star Tracker"; 14th AAS/AIAA Space Flight Mechanics Meeting, Maui, Hawaii; Feb. 2004; http://lairs.eng.buffalo.edu.

Markley et al.; "How to Estimate Attitude from Vector Observations"; NASA Document No. AAS99-427;1999.

* cited by examiner

SYSTEMS AND METHOD FOR GYROSCOPE CALIBRATION

BACKGROUND

1. Field

This disclosure relates generally to sensor devices, and more specifically, to using rotational data acquired from an accelerometer and a magnetometer in a system to calibrate a gyroscope sensor in the system.

2. Related Art

Recent trends in consumer electronic devices include addition of a variety of motion and positional sensors in such devices. These sensors include accelerometers to measure device acceleration or position with regard to gravity or other acceleration forces, magnetometers to measure device orientation to a magnetic field, and gyroscopes to determine angular velocity of the device for a variety of applications. Inclusion and intelligent use of multiple types of sensors has been called "sensor fusion." Useful application of sensor fusion involves accurate readings from all the sensors, and importantly from the gyroscope.

Gyroscope sensors used in the devices discussed above are typically microelectromechanical systems (MEMS) devices. MEMS gyroscopes can be susceptible to bias errors, in which, for example, the output of a stationary (not rotating) gyroscope is not zero. MEMS gyroscopes can also be susceptible to gain errors, in which the gyroscope fails to measure accurately the angular rotation of the system incorporating the gyroscope. Such errors can result in significant errors when using the gyroscope for applications involving navigation or requiring rotational accuracy.

Typically, MEMS gyroscopes are calibrated for bias and gain errors by the manufacturer prior to shipping the devices to customers. But once the gyroscope is in the field, there may be a need to recalibrate the gyroscope to maintain accuracy. It is therefore desirable to provide a mechanism by which MEMS gyroscopes can be recalibrated in the field.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism by which a MEMS gyroscope sensor can be calibrated or recalibrated using data gathered from other sensors in a system incorporating the MEMS gyroscope sensor. In one example, data gathered from an accelerometer and a magnetometer that are in a fixed orientation relative to the gyroscope is used to calculate changes in orientation of a system embodying all of the sensors. A constant acceleration vector (e.g., gravity) measured by the accelerometer and a constant magnetic vector (e.g., the Earth's magnetic field) measured by the magnetometer are used as reference vectors in a solution to Wahba's problem to calculate a rotation matrix providing the system's orientation with respect to those two constant vectors. By comparing changes in orientation from one measurement time to the next measurement time, measured rates of angular change can be calculated. The measured rates of angular change can be used along with observed gyroscope rates of angular change as input to a linear regression algorithm, which can be used to compute gyroscope trim parameters (e.g., bias and gain). Trimmed gyroscope readings can then be used for a variety of applications.

Figure 1:
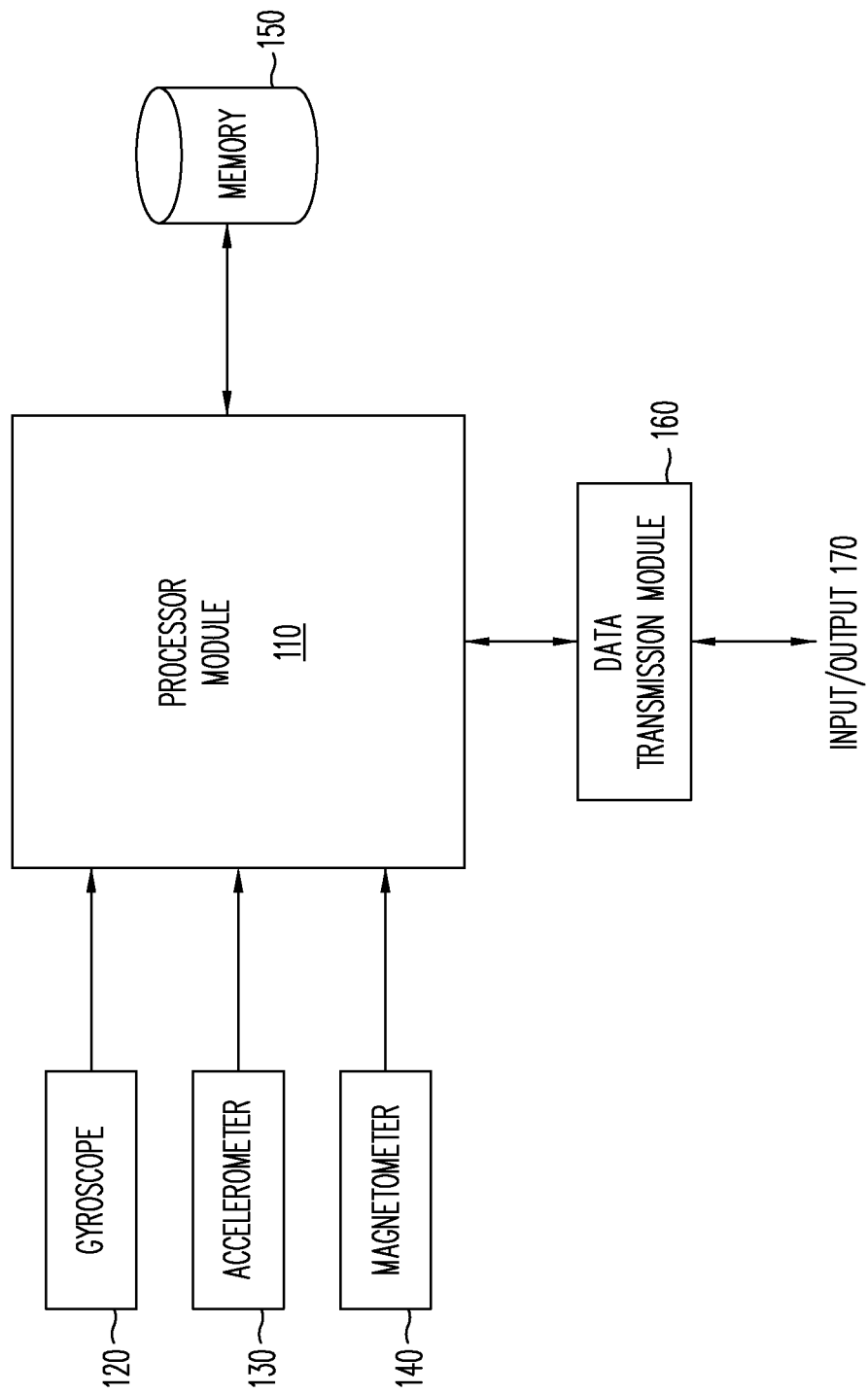
FIG. 1 is a simplified block diagram illustrating components of a typical sensor-based device usable with embodiments of the present invention.

FIG. 1 is a simplified block diagram illustrating components of an example of a sensor device package usable with embodiments of the present invention. The example sensor device package 100 includes a processor module 110 communicatively coupled to a gyroscope sensor 120, which can be an XYZ MEMS gyroscope 120, an XYZ accelerometer 130, and an XYZ magnetometer 140. As will be discussed in more detail below, each sensor can actually incorporate three sub sensors oriented orthogonally. Signals from each of the orthogonal sensors in the gyroscope, accelerometer, and magnetometer are provided to the processor module for interpretation. Sensor device package 100 also includes a memory 150 coupled to processor module 110, which can store at least calibration information for the variety of sensors. Processor module 110 is also communicatively coupled to a data transmission module 160 that can input and output signals 170 to a receiver and/or transmitter external to sensor device package 100. Alternative examples of sensor device packages may not have an incorporated processor module, and instead will communicate sensor signals to an external processor module or controller.

One rationale for embodiments of the present invention is to provide calibration data for gyroscope 120. Each sensor device package and sensors within that package can have characteristics that cause that particular sensor device package to differ in performance from an optimal sensor device package. For example, package stresses can differ from sensor device package to sensor device package and can affect movement of portions of MEMS-based sensors. Also, temperature changes can alter device electrical characteristics. To compensate for these differences, calibration information relating how that sensor device package differs from optimal should be stored and used by the processor module in the sensor device package. In the configuration illustrated in FIG. 1, such calibration, or trim, information is stored in memory 150. This calibration information can be generated by the manufacturer during testing of the sensor device package prior to shipping the package to customers, and can subsequently be updated using the mechanisms provided by embodiments of the present invention.

Figure 2:
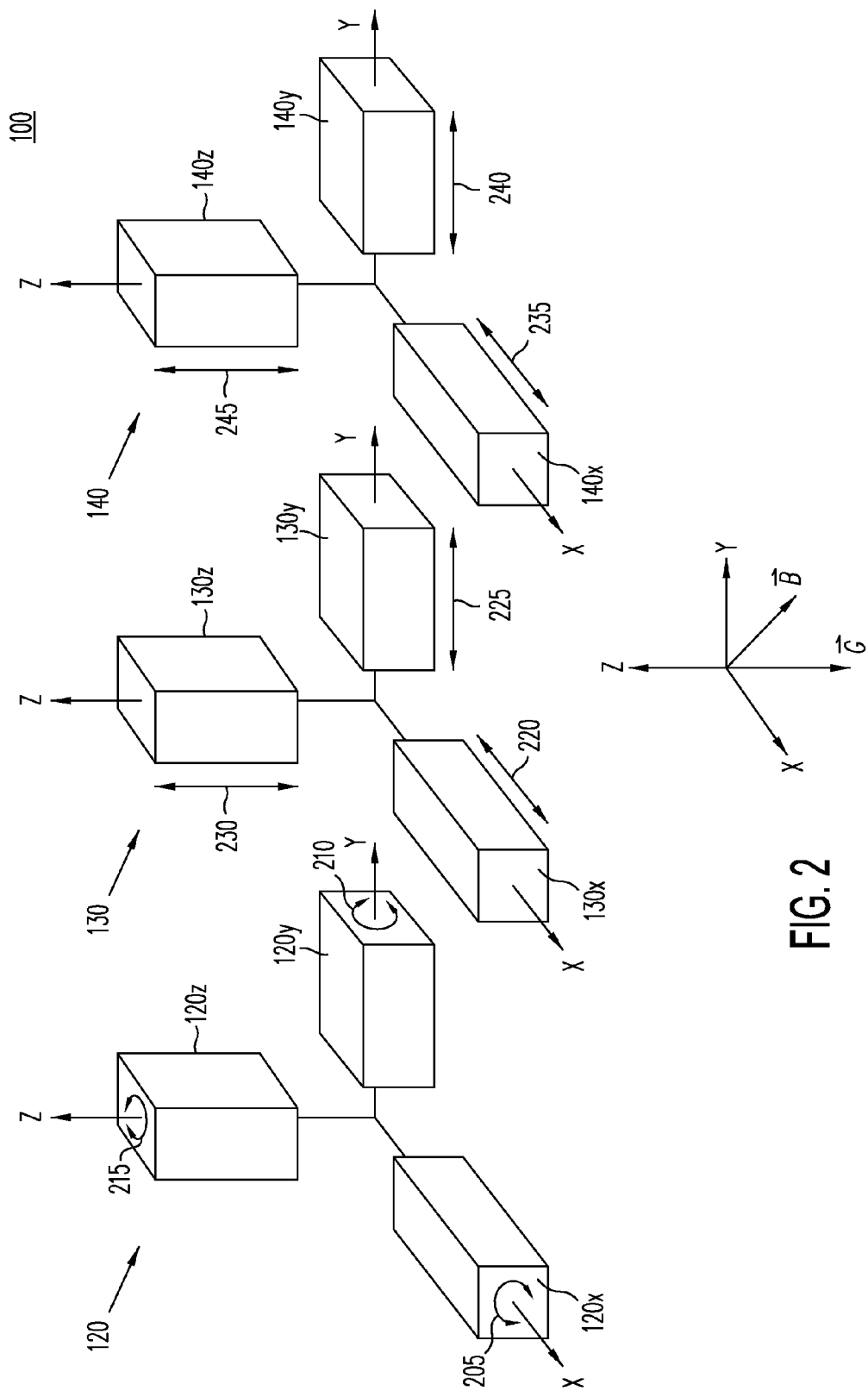
FIG. 2 is a simplified block diagram illustrating a perspective view of a three-axis sensor configuration of a system incorporating embodiments of the present invention.

FIG. 2 is a simplified block diagram illustrating a perspective view of a three-axis sensor configuration for gyroscopes, accelerometers, and magnetometers of a system incorporating embodiments of the present invention. In the illustrated embodiment, three gyroscopes (120x, 120y, and 120z) are orthogonally mounted in sensor package 100. Three orthogonally-mounted accelerometers (130x, 130y, 130z) and three orthogonally-mounted magnetometers (140x, 140y, 140z) are also mounted in the sensor package 100. It should be understood that other embodiments can include additional directionally-sensitive sensor devices, either more sensors of the same types illustrated or sensitive to different directional forces. Although the embodiment illustrated in FIG. 2 provides each of gyroscope 120, accelerometer 130, and magnetometer 140 mounted along the same orthogonal axes, it should be understood that the various sensors can be mounted in independent orientations as long as the relationship between the variety of orientations is known.

Gyroscopes 120x, 120y, 120z are configured to sense rotation about the x-axis, the y-axis, and the z-axis respectively (illustrated by arrows 205, 210, and 215, respectively). Accelerometers 130x, 130y, 130z are configured to sense a linear acceleration along the x-axis, the y-axis, and the z-axis, respectively (illustrated by arrows 220, 225, and 230, respectively). Finally, magnetometers 140x, 140y, 140z are configured to sense orientation of a magnetic field in relation to the x-axis, the y-axis, and the z-axis, respectively (illustrated by arrows 235, 240, and 245, respectively). A gravity vector G and a magnetic field vector B can be determined from the accelerometers and the magnetometers. For purposes of embodiments of the present invention, a constant direction magnetic field (e.g., Earth magnetic north) is assumed so that it is known that during a rotation of system 100, the vectors being measured are constant in both absolute direction and magnitude.

Typically, a gyroscope is calibrated under controlled conditions by a manufacturer of the gyroscope. For example, the gyroscope system is mounted on a test stand that can rotate the gyroscope through a known angle at a known angular velocity. The signals from the gyroscope corresponding to measured angular change and measured angular velocity can be compared to the known values and the differences can be used to calculate the gain and bias for the gyroscope. For example, a calculated rotation vector Oc can be related to the actual rotation vector Og (i.e., the observed gyroscope rotation) by the formula: Oc=a*(Og−b), where a is the gain and b is the bias for the gyroscope. Thus, the gain a and bias b can be calculated if Oc and Og are known.

In the field, it is generally difficult or impossible to provide, for calibration purposes, the precise rotations about an axis that can be achieved in the manufacturer's laboratory. Field rotations often involve out-of-plane rotations. Embodiments of the present invention provide another means for determining these out-of-plane rotations to the accuracy of the accelerometers and magnetometers packaged with the gyroscopes (and other directionally sensitive sensors, if any). As shown below, the accelerometers and magnetometers can be used to measure rotation of the system with respect to two constant independent vectors—G (Earth's gravitational field) and B (Earth's magnetic field). A measured rotation vector can then be determined from measurements related to rotations about these known vectors and derivatives of those measurements (e.g., measurements taken at different times). The measured rotation vector determined by these measurements, along with an observed rotation vector from the gyroscope, can be used to calculate the bias and gain compensation values for the gyroscope.

Accelerometers 130 and magnetometers 140 are affected by rotation of sensor system 100 in a predictable manner. The magnitude of G and B should not change, since the Earth's gravitational and magnetic fields are locally constant, so long as linear acceleration and magnetic interference are both zero. But the direction of those vectors should change, provided that the rotation is about an axis not co-linear with the magnetometer or accelerometer. Based upon the rotation, two independent rotation measurements are determined from the changes in direction sensed by the accelerometers and magnetometers.

Figure 3:
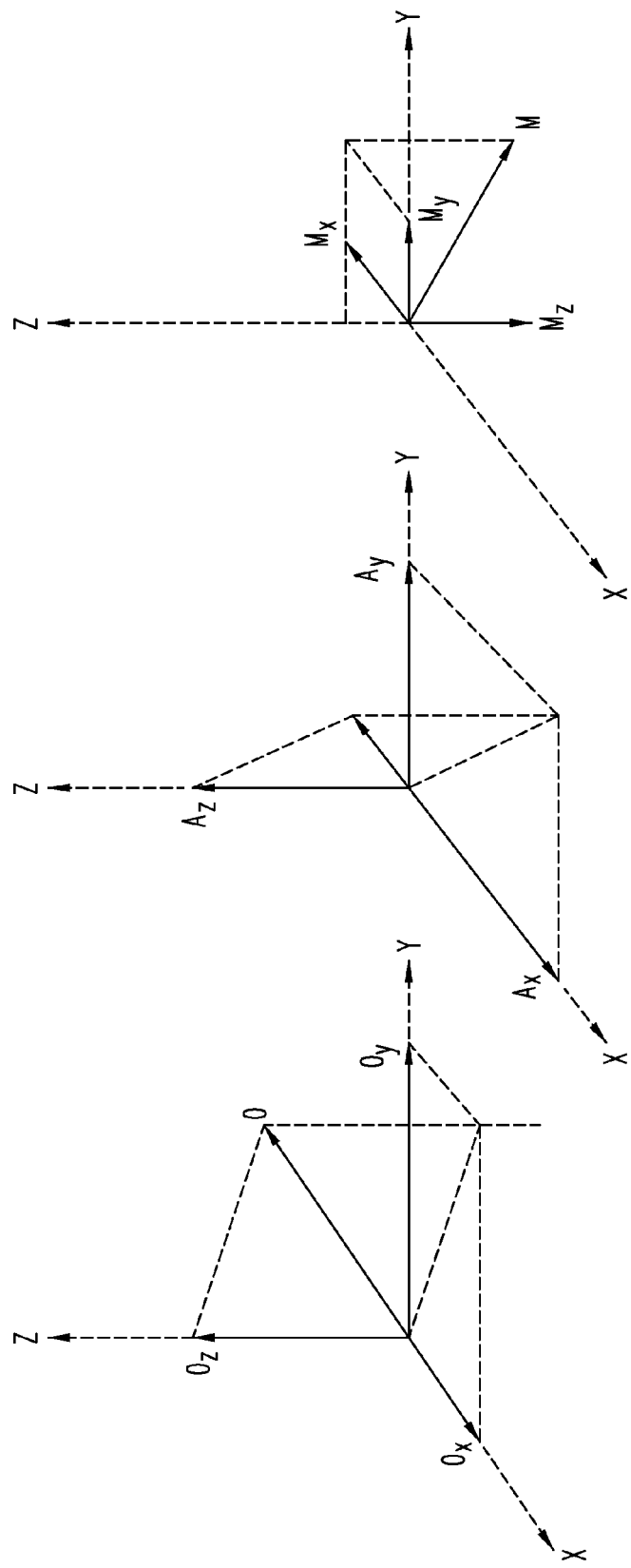
FIG. 3 is a simplified block diagram illustrating an observed rotation vector O and two independent vectors A (associated with accelerometers) and M (associated with magnetometers).

FIG. 3 is a simplified block diagram illustrating an observed rotation vector O and two independent vectors A (associated with accelerometers 130) and M (associated with magnetometers 140). The observed gyroscope rotation vector O includes an x-axis component Ox, a y-axis component Oy, and a z-axis component Oz. The first independent vector A (measured by the accelerometer) includes an x-axis component Ax, a y-axis component Ay, and a z-axis component Az. The second independent vector M (measured by the magnetometer) includes an x-axis component Mx, a y-axis component Ay, and a z-axis component Mz.

From a set of measurements obtained from accelerometers 130 and magnetometers 140, along with observed measurements from gyroscopes 120, a linear regression analysis can be used to determine the gain a and bias b for one or more of the gyroscopes. Correlation can be performed to relate the fit of the rotations measured with respect to the independent vectors and the observed gyroscope rotation vector O.

Embodiments of the present invention determine the rotation using an application of Wahba's problem. Solutions to Wahba's problem find a rotation matrix between two coordinate systems from a set of weighted vector observations. Historically, Wahba's problem (first posed in 1965) solutions have been used to determine attitude of satellites. Device orientation is determined by minimizing a loss function L(A), where A is the computed rotation matrix designed to rotate observed vectors back into a known reference system. The loss function sought to be minimized is:

$$L(A) = \frac{1}{2}\sum_{j=1}^{n} a_j[v_j - Ar_j]^2$$

where,
$a_j$=a set of positive weighting parameters;
$v_j$=observed vectors
$r_j$=reference vectors.

In the above, A is the mapping to rotate the observed accelerometer and magnetometer readings at a first orientation of the sensors to a second orientation of the sensors. Comparisons between mappings (rotation matrices) can be used to determine a change in orientation over the time between measurements.

$$\Omega = \frac{1}{\Delta T}(Rm - oldRm)/oldRm = \frac{1}{\Delta T}(Rm - oldRm)Rm^T$$

$$\Omega = \begin{pmatrix} 0 & -\omega_z & \omega_y \\ \omega_z & 0 & -\omega_x \\ -\omega_y & \omega_x & 0 \end{pmatrix}$$

$$\omega_x = \frac{1}{2}(\Omega(3,2) - \Omega(2,3))$$

-continued $$\omega_y = \frac{1}{2}(\Omega(1, 3) - \Omega(3, 1))$$

$$\omega_z = \frac{1}{2}(\Omega(2, 1) - \Omega(1, 2))$$

$\omega_x$, $\omega_y$, and $\omega_z$ are the angular velocities about the three axes of the gyroscope, and map to the same terms normally measured by the gyroscope. These angular velocities can then be used in a linear regression calculation to obtain the gyroscope gain and bias usable for correcting the measured gyroscope sensor values. These calculations rely upon a small angle approximation for $\Omega$, which is reasonable in light of the typical angles, angular rates and sample rates used for gyroscope testing.

Figure 4:
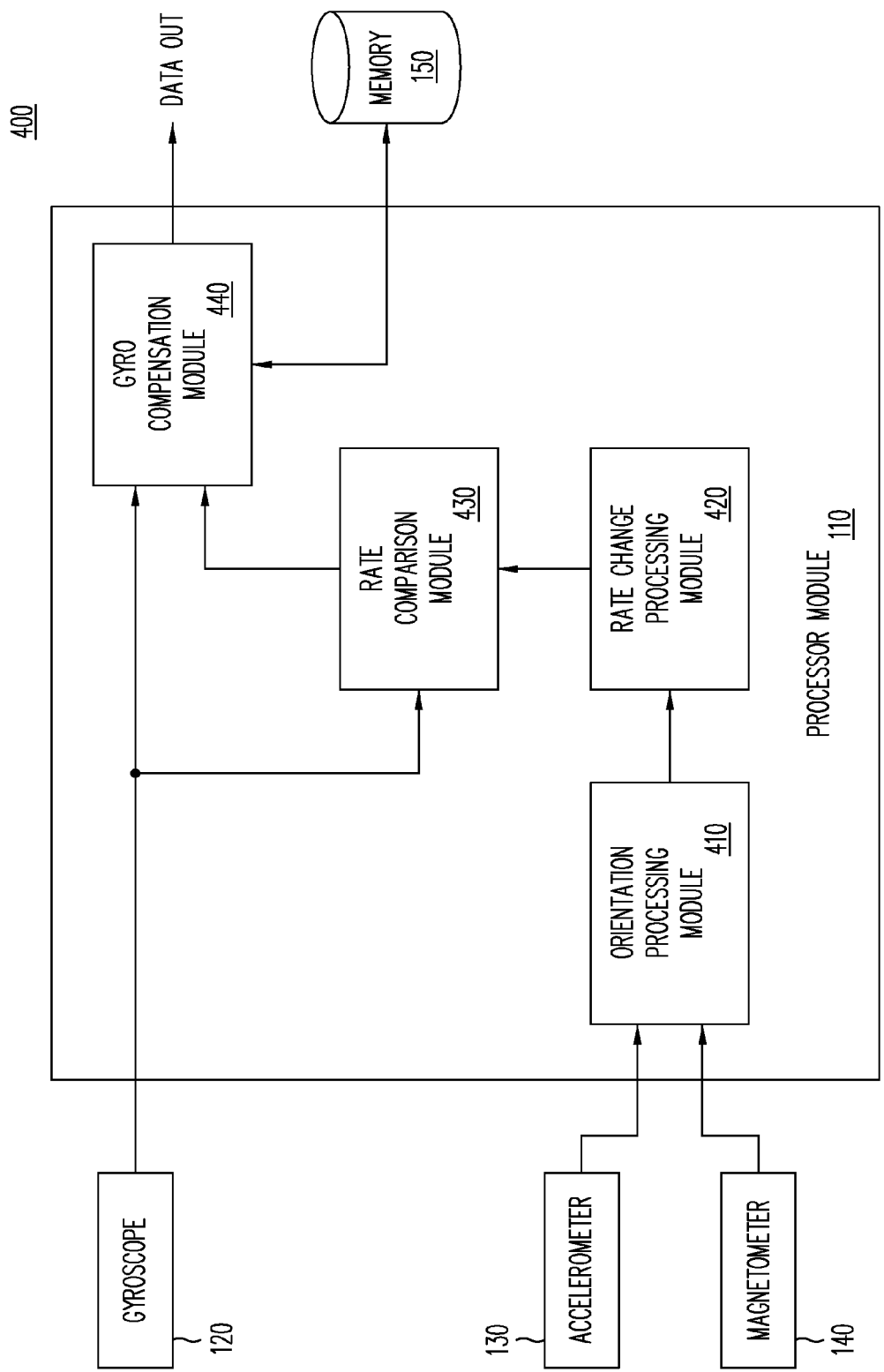
FIG. 4 is a simplified block diagram illustrating a system configured to provide a self-trimming gyroscope in accord with embodiments of the present invention.

FIG. 4 is a simplified block diagram illustrating a system configured to provide a self-trimming gyroscope in accord with embodiments of the present invention. As illustrated in FIG. 1, gyroscopes 120, accelerometers 130, and magnetometers 140 are communicatively coupled with processor module 110. Signals generated in response to the rotations discussed above are provided by accelerometers 130 and magnetometers 140 to an orientation processing module 410 provided by processor module 110. Orientation processing module 410 is configured to calculate a measured rotation of the sensors in system 100, by solving for the rotation matrices according to Wahba's problem, as detailed above. Rotation matrices are determined at discrete times, either at predetermined intervals or on demand. Results of the orientation calculations are provided by orientation processing module 410 to a rate of change processing module 420. Rate of change processing module calculates measured angular rate of change (e.g., angular velocity), for example, by determining differences of rotation orientation at the discrete times.

In the manner described above, the combination of the accelerometers and magnetometers with the orientation processing module and rate change processing module provide a virtual gyroscope. That is, functionality of a gyroscope is provided through the data generated by the sensors and calculated by the processing modules. It should be noted that provision of virtual gyroscope functionality is not limited to the disclosed accelerometers and magnetometers and can be provided by inclusion of other positional sensors, including additional accelerometers/magnetometers oriented along other coordinate axes.

Once virtual gyroscope processing is performed, rate of change processing module 420 can then provide the measured angular rate of change to a rate comparison module 430. The rate comparison module compares the measured angular rate of change from the virtual gyroscope to the apparent angular rate of change generated by gyroscope sensors 120 in order to determine the error in the gyroscope. One embodiment of the present invention performs these comparisons by performing a linear regression analysis using a set of data points generated over a sufficient number of time periods to provide a statistically significant set of data. Rate comparison module 430 can provide the results of the linear regression analysis to a gyro compensation module 440 that can use the information to dynamically trim the gyroscope. For example, gain and bias values can be calculated and stored in memory 150 to trim the gyroscope for future operations where it is desirable to not perform virtual gyroscope functions with the accelerometer and magnetometer. In addition, rate comparison module 140 can store the calculated results of the linear regression analysis to memory 150 for further use.

Figure 5:
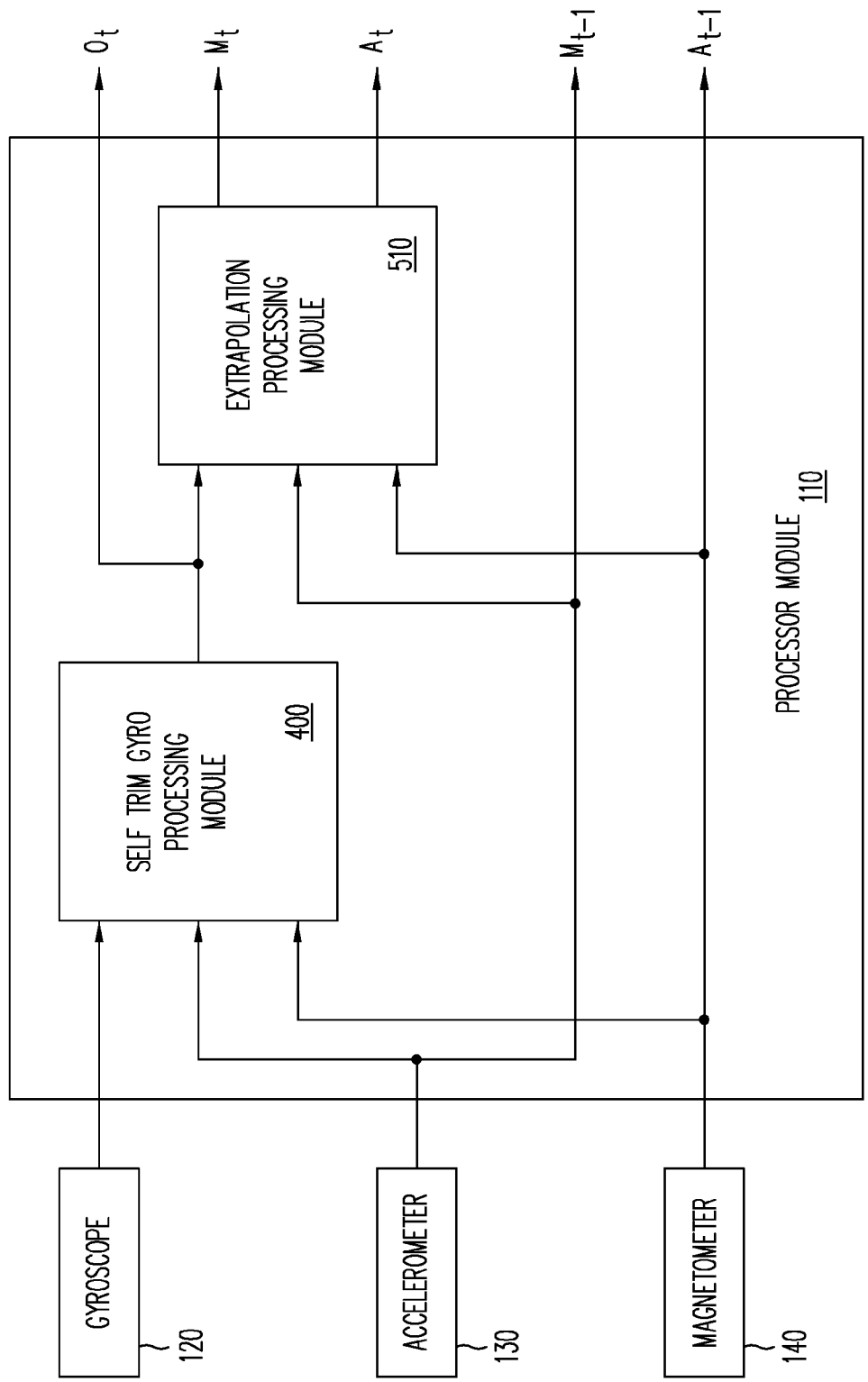
FIG. 5 is a simplified block diagram illustrating a system configured to further utilize the information generated by the self-trimming gyroscope to provide gyroscope stabilized estimates of gravity and magnetic field.

FIG. 5 is a simplified block diagram illustrating a system configured to further utilize the information generated by the self-trimming gyroscope to provide a gyroscope stabilized estimate of orientation. Building on the embodiment illustrated in FIG. 4, processor module 110 further provides an extrapolation processing module 510 coupled to receive output signals from self-trimming gyroscope processing module 400 as well as from accelerometer 130 and magnetometer 140. Previous gravity and magnetic vector A(t-1) and M(t-1), respectively, at time t-1 can be used in conjunction with the trimmed gyroscope values for angular velocity to compute "gyro stabilized" values of gravity and magnetic vectors at time t. Since these values are based solely upon past (i.e., known) values rotated based upon gyroscope rates, the values are independent of linear acceleration and magnetic interference for at least an initial time t. In order to avoid errors that may accumulate after the initial time t, mixing of extrapolated and measured values over time can be used.

The gyroscope stabilized estimate of orientation provided in FIG. 5 illustrates how sensor fusion systems such as those provided by embodiments of the present invention can be used as building blocks for more sophisticated systems providing a variety of functionality. Further, such sensor fusion systems illustrate how base functionality (e.g., measurement of angular velocity) can be provided even when a sensor specifically provided for that functionality no longer is operable, or the values from that sensor can be checked by referring to other sensors in the system (e.g., through a virtual gyroscope).

Figure 6:
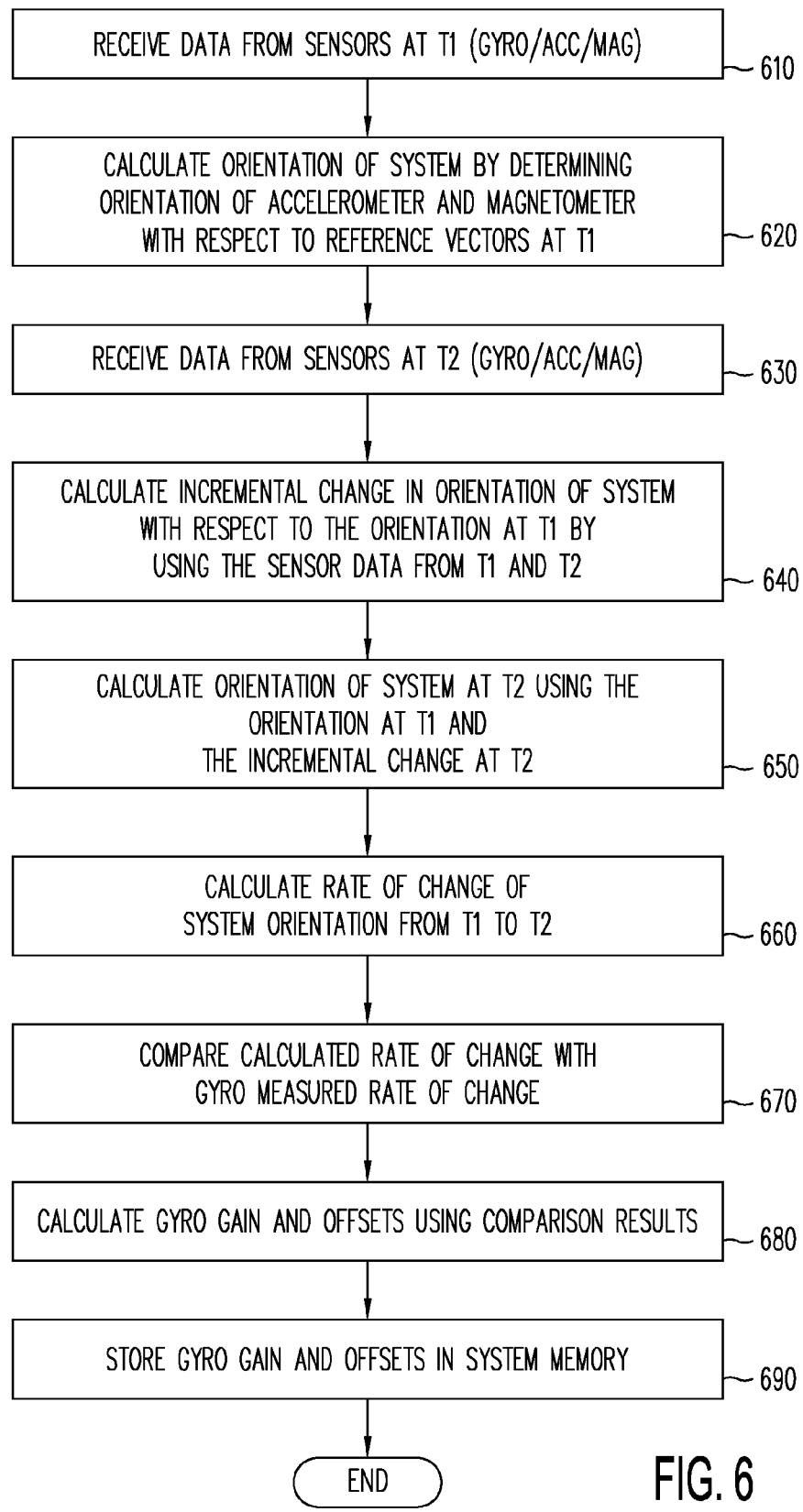
FIG. 6 is a simplified flow diagram illustrating an example of a process for providing a self-trimming gyroscope in accord with embodiments of the present invention.

FIG. 6 is a simplified flow diagram illustrating an example of a process for providing a self-trimming gyroscope in accord with embodiments of the present invention. At a time T1, data is received from a cluster of sensors (e.g., gyroscope, accelerometer, and magnetometer) (610). An orientation of the system with respect to reference vectors is then determined at time T1 (620). The orientation is calculated from the data generated at time T1 by concurrently determining an orientation of the system from data generated by a set of accelerometers, for example, with respect to a gravity vector and of a set of magnetometers, for example, with respect to a known magnetic field vector. As discussed above, the system orientation is calculated using a solution to Wahba's problem, in which a rotation matrix is calculated from a comparison of the measured values to the known gravity vector and magnetic field vector (e.g., Earth's gravity and Earth's magnetic field).

Subsequently, at a time T2, data is received from the cluster of sensors (630). An incremental change in orientation of the system incorporating the cluster of sensors is determined at time T2 (640). The incremental change in orientation of the system is determined from the data received at time T2 and using the data received at time T1 as a reference vector. Again, this is calculated from a rotation matrix generated using the solution to Wahba's problem.

Once the incremental change in the orientation of the system at time T2 is calculated from the accelerometer and magnetometer data, an orientation of the system at time T2 can be calculated using the calculated value of the orientation at time T1 and the incremental change at time T2 (650). In one embodiment, the orientation of the system at time T2 can be calculated by performing a multiplication of the orientation at time T1 with the incremental orientation at time T2.

Using the calculated orientations of the system at T1 and T2, a measured rate of change of the system orientation is generated (e.g., angular velocity) (660). At this point, the rotational orientation information and rate of change of system orientation are "virtual gyroscope" values that can be used in the place of physical gyroscope values should a system not include a physical gyroscope.

The calculated rate of change of system orientation information can also be used in a comparison with an apparent rate of change measured by a physical gyroscope in the system (670). Such a comparison can be performed using a linear regression analysis, for example, wherein systemic differences in values measured by the physical gyroscope and the virtual gyroscope are determined. Gain and bias offset values for the physical gyroscope can be calculated using the results of the comparison (680). Once gain and bias offset values are determined, they can be stored in a system memory for use in trimming the physical gyroscope in future measurements (690).

The above discussion presents an embodiment in which the gyroscopes, accelerometers, and magnetometers are all part of a single system. It is envisioned that in such an embodiment, the gyroscope can be continuously trimmed in real time by using the measurements of the other sensors, as discussed above. Alternatively, the self-trimming operations discussed can be performed periodically to re-trim the gyroscope over the life of a device incorporating the discussed sensors. As a further alternative, a device incorporating only a gyroscope can be field trimmed by mounting the device on a test stand incorporating an accelerometer and a magnetometer in a known, or measurable, orientation to the device. Rotations of the test stand can be performed to generate the data necessary for trimming. In such a case, the processing modules that perform the trimming operations can be external to the device and then provide the trim information to the device processor for storage as a new trim value to be used for future operations. It should be realized embodiments of the present invention are not limited by the physical setup used to relate the various sensors used to determine rotation.

By now it should be appreciated that there has been provided a system that includes a first set of directionally sensitive sensors, a second set of directionally sensitive sensors, and a processor communicatively coupled to the first and second sets of directionally sensitive sensors. The first set of directionally sensitive sensors includes three orthogonally-oriented sensors configured to respond to gravity. The second set of directionally sensitive sensors includes three orthogonally-oriented sensors configured to respond to a constant magnetic field. The processor is configured to: determine a first orientation of the system with respect to a gravity vector by using signals received from the first set of directionally sensitive sensors at a first time and a magnetic field vector by using signals received from the second set of directionally sensitive sensors at the first time, where the determining of the first orientation of the system is performed using a minimized loss function solution to Wahba's problem in which the gravity vector and the magnetic field vector are fixed reference vectors; determine an incremental change in orientation of the system with respect to the first orientation by using signals from the first set of directionally sensitive sensors at the first time and at a second time and by using signals from the second set of directionally sensitive sensors at the first time and the second time, where determining the incremental change in orientation of the system is performed using a minimized loss function solution to Wahba's problem comparing the sensor signals from the first and second times; determine a second orientation of the system using the first orientation and the incremental change in orientation of the system; and determine a measured angular rate of change of the system using the determined first orientation of the system and the determined second orientation of the system.

In one aspect of the above embodiment, the system further includes a set of gyroscope sensors. The set of gyroscope sensors includes three sensors oriented on orthogonally-oriented axes, where each sensor is configured to respond to rotation about the corresponding axis. The processor is communicatively coupled to the set of gyroscope sensors and is configured to determine an observed angular rate of change of the system using signals received from the set of gyroscope sensors during the period between the first time and the second time.

In a further aspect, the processor is also configured to: determine a set of measured angular rates of change of the system over a plurality of time periods; perform a linear regression analysis to determine a difference between the set of observed angular rates of change over the plurality of time periods and the set of measured angular rates of change of the system; and determine gyroscope gain and bias from the determined difference. In still a further aspect, the system further includes a memory that is coupled to the processor and is configured to store the gyroscope gain and bias. In yet a further aspect, the processor is configured to use the stored gyroscope gain and bias as trim parameters for subsequent gyroscope functions.

In another aspect of the above embodiment, the measured angular rate of change of the system is used in virtual gyroscope applications. In another aspect of the above embodiment, the minimized loss function solution to Wahba's problem provides a mapping between measured values detected from the sensors and the respective fixed reference vectors.

Another embodiment of the present invention provides a method that includes: determining a first orientation of a system with respect to a gravity vector using signals received from a first set of directionally sensitive sensors at a first time and a magnetic field vector using signals received from a second set of directionally sensitive sensors at the first time; determining an incremental change in orientation of the system with respect to the first orientation using signals received from the first set of directionally sensitive sensors at the first time and at a second time and using signals from the second set of directionally sensitive sensors at the first time and at the second time; determining a second orientation of the system using the first orientation and the incremental change in orientation of the system; and determining a measured angular rate of change of the system using the first orientation of the system and the second orientation of the system. Determining the first orientation of the system is performed using a minimized loss function solution to Wahba's problem where the gravity vector and the magnetic field vector are fixed reference vectors. Determining the incremental change in orientation of the system is performed using a minimized loss function solution to Wahba's problem where the sensors signals from the first time and the second time are compared.

One aspect of the above embodiment further includes determining an observed angular rate of change of the system using signals received from a set of gyroscope sensors during a period between the first time and the second time. A further aspect includes: determining a set of measured angular rates of change of the system over a plurality of time periods; performing a linear regression analysis to determine a difference between a set of observed angular rates of change over the plurality of time periods and the set of measured angular rates of change of the system over the plurality of time periods; and, determining gyroscope gain and bias from the determined difference for the set of gyroscope sensors. A further aspect provides for storing the gyroscope gain and bias. And a further aspect provides for using the stored gyroscope gain and bias as trim parameters for subsequent gyroscope functions. In another further aspect, the method provides for using the measured angular rate of change of the system in virtual gyroscope applications.

In another aspect, the first set of directionally sensitive sensors includes three orthogonally-oriented sensors configured to respond to gravity. In a further aspect, the three orthogonally-oriented sensors configured to respond to gravity include accelerometers. In another aspect, the second set of directionally sensitive sensors includes three orthogonally-oriented sensors configured to respond to a constant magnetic field. In a further aspect, the three orthogonally-oriented sensors configured to respond to the constant magnetic field include magnetometers.

Another aspect of the above embodiment includes providing a mapping between measured values detected from the first and second sets of directionally-sensitive sensors and the respective fixed reference vectors using the minimized loss function solution to Wahba's problem.

Another embodiment of the present invention provides an apparatus that includes: a first set of directionally sensitive sensors configured to respond to gravity; a second set of directionally sensitive sensors configured to respond to a constant magnetic field; means for determining a first orientation of a system with respect to a gravity vector using signals received from the first set of directionally sensitive sensors at a first time and with respect to a magnetic field vector using signals received from the second set of directionally sensitive sensors at the first time; means for determining an incremental change in orientation of the system with respect to the first orientation using signals received from the first set of directionally sensitive sensors at the first time and at a second time and using signals received from the second set of directionally sensitive sensors at the first time and at the second time; means for determining a second orientation using the first orientation and the incremental change in orientation of the system; and means for determining a measured angular rate of change of the system using the determined first orientation of the system and the determined second orientation of the system. The means for determining the first orientation of the system uses a minimized loss function solution to Wahba's problem where the gravity vector and the magnetic field vector are fixed reference vectors. The means for determining the incremental change in orientation of the system uses a minimized loss function solution to Wahba's problem comparing the sensor signals from the first time and the second time.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located in a single package. Alternatively, system 100 may include any number of separately packaged circuits interconnected with each other. For example, the sensors may be located in the same package or in different packages in known fixed orientations to one another. Memory 150 can be located in the same package as processor module 110 or in a different package.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from computer readable media such as memory 150 or other media on other computer systems. Such computer readable media may be permanently, removably or remotely coupled to processing system such as system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, and the like.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

As discussed above, although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
   a first set of directionally sensitive sensors, wherein the first set of directionally sensitive sensors comprises three orthogonally-oriented sensors configured to respond to gravity;
   a second set of directionally sensitive sensors, wherein the second set of directionally sensitive sensors comprises three orthogonally-oriented sensors configured to respond to a constant magnetic field;
   a set of gyroscope sensors, wherein the set of gyroscope sensors comprises three sensors oriented on orthogonally-oriented axes each configured to respond to rotation about a corresponding axis;
   a processor, communicatively coupled to the first and second sets of directionally sensitive sensors and the set of gyroscope sensors, and configured to
      determine a first orientation of the system with respect to
         a gravity vector using signals received from the first set of directionally sensitive sensors at a first time, and
         a magnetic field vector using signals received from the second set of directionally sensitive sensors at the first time, wherein
            said determining the first orientation of the system is performed using a minimized loss function solution to Wahba's problem wherein the gravity vector and the magnetic field vector are fixed reference vectors,
      determine an incremental change in orientation of the system with respect to the first orientation using signals from the first set of directionally sensitive sensors at the first time and at a second time and using signals from the second set of directionally sensitive sensors at the first time and the second time, wherein
         said determining the incremental change in orientation of the system is performed using a minimized loss function solution to Wahba's problem comparing the sensor signals from the first time and the second time,
      determine a second orientation of the system using the first orientation and the incremental change in orientation of the system,
      determine a measured angular rate of change of the system using the determined first orientation of the system and the determined second orientation of the system,
      determine an observed angular rate of change of the system using signals received from the set of gyroscope sensors during a period between the first time and the second time,
      determine a set of measured angular rates of change of the system over a plurality of time periods,
      perform a linear regression analysis to determine a difference between a set of observed angular rates of change over the plurality of time periods and the set of measured angular rates of change of the system, and
      determine gyroscope gain and bias from the determined difference.

2. The system of claim 1 further comprising:
   a memory, coupled to the processor, and configured to store the gyroscope gain and bias.

3. The system of claim 2 further comprising:
   the processor is further configured to use the stored gyroscope gain and bias as trim parameters for subsequent gyroscope functions.

4. The system of claim 1 wherein the measured angular rate of change of the system is used in virtual gyroscope applications.

5. The system of claim 1 wherein the minimized loss function solution to Wahba's problem provides a mapping between measured values detected from the sensors and the fixed reference vectors.

6. A method comprising:
   determining a first orientation of a system with respect to a gravity vector using signals received from a first set of directionally sensitive sensors at a first time and a magnetic field vector using signals received from a second set of directionally sensitive sensors at the first time, wherein
      said determining the first orientation of the system is performed using a minimized loss function solution to Wahba's problem wherein the gravity vector and the magnetic field vector are fixed reference vectors;
   determining an incremental change in orientation of the system with respect to the first orientation using signals from the first set of directionally sensitive sensors at the first time and at a second time and using signals from the second set of directionally sensitive sensors at the first time and at the second time, wherein
      said determining the incremental change in orientation of the system is performed using a minimized loss function solution to Wahba's problem comparing the sensor signals from the first time and the second time;
   determining a second orientation of the system using the first orientation and the incremental change in orientation of the system;

determining a measured angular rate of change of the system using the first orientation of the system and the second orientation of the system;

determining an observed angular rate of change of the system using signals received from a set of gyroscope sensors during a period between the first time and the second time;

determining a set of measured angular rates of change of the system over a plurality of time periods;

performing a linear regression analysis to determine a difference between a set of observed angular rates of change over the plurality of time periods and the set of measured angular rates of change of the system over the plurality of time periods; and determining gyroscope gain and bias for the set of gyroscope sensors from the determined difference.

7. The method of claim 6 further comprising storing the gyroscope gain and bias.

8. The method of claim 7 further comprising using the stored gyroscope gain and bias as trim parameters for subsequent gyroscope functions.

9. The method of claim 6 further comprising using the measured angular rate of change of the system in virtual gyroscope applications.

10. The method of claim 6 wherein the first set of directionally sensitive sensors comprises three orthogonally-oriented sensors configured to respond to gravity.

11. The method of claim 10 wherein the three orthogonally-oriented sensors configured to respond to gravity comprise accelerometers.

12. The method of claim 6 wherein the second set of directionally sensitive sensors comprises three orthogonally-oriented sensors configured to respond to a constant magnetic field.

13. The method of claim 12 wherein the three orthogonally-oriented sensors configured to respond to the constant magnetic field comprises magnetometers.

14. The method of claim 6 further comprising providing a mapping between measured values detected from the first and second sets of directionally-sensitive sensors and the respective fixed reference vectors using the minimized loss function solution to Wahba's problem.

15. An apparatus comprising:

a first set of directionally sensitive sensors configured to respond to gravity;

a second set of directionally sensitive sensors configured to respond to a constant magnetic field;

a set of gyroscope sensors, wherein the set of gyroscope sensors comprises three sensors oriented on orthogonally-oriented axes each configured to respond to rotation about a corresponding axis;

means for determining a first orientation of a system with respect to a gravity vector using signals received from the first set of directionally sensitive sensors at a first time and with respect to a magnetic field vector using signals received from the second set of directionally sensitive sensors at the first time, wherein the means for determining the first orientation of the system uses a minimized loss function solution to Wahba's problem wherein the gravity vector and the magnetic field vector are fixed reference vectors;

means for determining an incremental change in orientation of the system with respect to the first orientation using signals received from the first set of directionally sensitive sensors at the first time and at a second time and using signals received from the second set of directionally sensitive sensors at the first time and at the second time, wherein said means for determining the incremental change in orientation of the system uses a minimized loss function solution to Wahba's problem comparing the sensor signals from the first time and the second time;

means for determining a second orientation using the first orientation and the incremental change in orientation of the system;

means for determining a measured angular rate of change of the system using the determined first orientation of the system and the determined second orientation of the system;

means for determining an observed angular rate of change of the system using signals received from the set of gyroscope sensors during a period between the first time and the second time;

means for determining a set of measured angular rates of change of the system over a plurality of time periods;

means for performing a linear regression analysis to determine a difference between a set of observed angular rates of change over the plurality of time periods and the set of measured angular rates of change of the system; and means for determining gyroscope gain and bias from the determined difference.

* * * * *